US012749220B2

(12) United States Patent
Lore et al.

(10) Patent No.: US 12,749,220 B2
(45) Date of Patent: Sep. 29, 2026

(54) POSE ESTIMATION FROM 2D BORESCOPE INSPECTION VIDEOS VIA STRUCTURE FROM MOTION

(71) Applicant: RTX Corporation, Farmington, CT (US)

(72) Inventors: Kin Gwn Lore, Belmont, MA (US); Ganesh Sundaramoorthi, Duluth, GA (US)

(73) Assignee: RTX CORPORATION, Arlington, VA (US)

( * ) Notice: Subject to any disclaimer, the term of this patent is extended or adjusted under 35 U.S.C. 154(b) by 237 days.

(21) Appl. No.: 18/540,053

(22) Filed: Dec. 14, 2023

(65) Prior Publication Data

US 2025/0200801 A1 Jun. 19, 2025

(51) Int. Cl.

*G06T 7/73* (2017.01)
*G06T 7/246* (2017.01)
*G06T 17/00* (2006.01)

(52) U.S. Cl.

CPC ................ *G06T 7/75* (2017.01); *G06T 7/251* (2017.01); *G06T 17/00* (2013.01); *G06T 2207/10016* (2013.01); *G06T 2210/56* (2013.01)

(58) Field of Classification Search

CPC ........... G06T 7/75; G06T 7/251; G06T 17/00; G06T 2207/10016; G06T 2210/56;

(Continued)

(56) References Cited

U.S. PATENT DOCUMENTS

| | | | |
|---|---|---|---|
| 9,740,935 | B2 | 8/2017 | Dusik et al. |
| 10,679,066 | B2 | 6/2020 | Pathak et al. |

(Continued)

FOREIGN PATENT DOCUMENTS

| | | | |
|---|---|---|---|
| WO | 2020014170 | A1 | 1/2020 |
| WO | 2020086217 | A1 | 4/2020 |

(Continued)

OTHER PUBLICATIONS

Aust et al. "Automated defect detection and decision-support in gas turbine blade inspection" Aerospace 8.2 (Jan. 2021): 30 (27 pages).

(Continued)

*Primary Examiner* — Oneal R Mistry

(74) *Attorney, Agent, or Firm* — CANTOR COLBURN LLP

(57) ABSTRACT

A method for generating a pose estimation for an object from a 2D borescope inspection video including generating a model 3D point cloud of a predetermined area of an object using a Computer Aided Design (CAD) assembly model of the object, extracting a video frame sequence from a 2D borescope inspection video of the object, generating an estimated 3D point cloud by processing the video frame sequence using a Structure-from-Motion (SfM) algorithm, identifying a common coordinate system with respect to the model 3D point cloud and the estimated 3D point cloud and computing a rough alignment by processing the common coordinate system, the model 3D point cloud and the estimated 3D point cloud using a global registration algorithm and generating a fine registration pose estimation by processing the rough alignment of the object.

20 Claims, 7 Drawing Sheets

(58) Field of Classification Search
CPC . G06T 2207/10028; G06T 2207/30164; G06T 2207/30244; G06T 7/0004
See application file for complete search history.

(56) References Cited

U.S. PATENT DOCUMENTS

| | | | | | |
|---|---|---|---|---|---|
| 10,902,664 | B2 * | 1/2021 | Xiong | F01D 21/003 |
| 11,062,207 | B2 | 7/2021 | Giering et al. | |
| 11,199,831 | B2 * | 12/2021 | Srivastava | G05B 19/4099 |
| 11,443,454 | B2 | 9/2022 | Duong et al. | |
| 11,579,046 | B2 | 2/2023 | Pulisciano et al. | |
| 2022/0198753 | A1 * | 6/2022 | Sawhney | G06T 19/00 |
| 2023/0216658 | A1 * | 7/2023 | Barnes | G06T 1/0007<br>713/193 |

FOREIGN PATENT DOCUMENTS

| | | | | |
|---|---|---|---|---|
| WO | 2022172048 | A1 | 8/2022 | |
| WO | WO-2022259383 | A1 * | 12/2022 | G06F 30/10 |
| WO | WO-2024186245 | A1 * | 9/2024 | G06T 7/579 |

OTHER PUBLICATIONS

Svensen et al. "Deep neural networks analysis of borescope images" Proceedings of the European Conference of the PHM Society. vol. 4. (Jul. 2018) 8 pages.

Uzun, Ismail "Damage detection in aircraft engine borescope inspection using deep learning" Republic of Turkey Aksaray University Graduate School of Natural and Applied Sciences (Jan. 2023) 82 pages.

Wong et al. "Automatic borescope damage assessments for gas turbine blades via deep learning" AIAA Scitech 2021 Forum. (Mar. 2021) 17 pages.

Cheng et al. "Monocular vision-based 3D reconstruction of aero-engine blade damage" 2023 Prognostics and Health Management Conference (PHM). IEEE, May 31 2023 pp. 278-283.

Liu "Point Cloud registration based on iterative closest point" International Conference on Computer Vision and Pattern Analysis (ICCPA 2021). vol. 12158. SPIE. Mar. 2, 2022 (5 pages).

Search Report issued in European Patent Application No. 242064780; Date of Mailing Mar. 27, 2025 (11 pages).

Zhang et al. "Structure-from-motion based image unwrapping and stitching for small bore pipe inspections" Computers in Industry 139 (Aug. 2022): 103664 (9 pages).

Arcan et al. "Research on 3D reconstruction of small size objects using structure from motion photogrammetry via smartphone images" Jeodezi ve Jeoinformasyon Dergisi 10.2 (Jan. 2023) pp. 112-123.

Office Action issued in European Patent Application No. 24206478.0; Date of Mailing May 28, 2026 (9 pages).

Pirotti et al. "Implementation and assessment of two density-based outlier detection methods over large spatial point clouds" Open Geospatial Data, Software and Standards 3.1 (Sep. 2018): 14. (12 pages) .

Wolff et al. "Point cloud noise and outlier removal for image-based 3D reconstruction" 2016 Fourth International Conference on 3D Vision (3DV). IEEE, Oct. 2016. (10 pages).

* cited by examiner

POSE ESTIMATION FROM 2D BORESCOPE INSPECTION VIDEOS VIA STRUCTURE FROM MOTION

STATEMENT OF FEDERAL SUPPORT

This invention was made with Government support under Contract FA8650-21-C-5254 awarded by the United States Air Force. The Government has certain rights in this invention.

BACKGROUND

As is known, a borescope is an optical instrument that is designed to assist in the visual inspection of inaccessible regions of objects. A borescope includes a flexible tube which allows a person at one end of the tube to view images acquired at the other end. Thus, borescopes typically include a rigid or flexible tube having a display on one end and a camera on the other end, where the display is linked to the camera to display images (i.e., pictures/videos) taken by the camera. Borescopes may be used for many applications, such as the visual inspection of aircraft engines, industrial gas turbines, steam turbines, diesel turbines and automotive/truck engines. For example, when inspecting the internal structure of a jet engine for cracks or fatigue, small openings from the outside allow the borescope to be snaked into the engine without having to drop the engine from the plane. In such an inspection, it is often difficult for the inspector to know the exact borescope tip location within the engine, making it difficult to identify the location of new defects (i.e., cracks) found or to return to previously identified trouble spots.

When a defect is found, the inspector must measure the characteristics of the defect (e.g., length and width) which is problematic if the borescope's pose is unknown. One approach to try and solve this problem is to map the defect onto a CAD model of the object having the defect. The current method 100 of mapping a defect of an object onto a CAD model is illustrated in FIG. 1, where a borescope video of an object is obtained and visual analytics are performed 102 to detect defects in the object. The images of the borescope video are aligned with the CAD model 104 based on the observed (i.e., inferred) object pose and the projected detected defects from the images are mapped to the CAD model 106, which is then digitized. Unfortunately however, digitizing identified defects is a challenge due to the need for pose estimation to map the detected defects onto a CAD model. While pose estimation may be performed for RGB/monochrome images and depth modality, the obtained image datasets typically lack sufficient depth sensor data to provide depth information to ease alignment. Understanding pose and position of a moving camera in scene, or pose of an object part, is important for situational awareness and other 3D-space analysis. CAD model needs to be registered to the image/video frame, so that any visual detections can be projected onto the CAD model for digitization. And for an egocentric camera (i.e., a borescope), it is challenging to register the CAD model to the observed scene due to the permanent occlusion and the small field of view.

BRIEF DESCRIPTION

Disclosed is a method for generating a pose estimation for an object from a 2D borescope inspection video, wherein the method includes generating a Computer Aided Design (CAD) assembly model of an object, generating a model 3D point cloud of the object using the CAD assembly model, generating a 2D borescope inspection video of the object, wherein the 2D borescope inspection video includes a plurality of video frames and extracting a video frame sequence from the plurality of video frames. The method further includes generating a coarse estimated point cloud video frame sequence by applying a Structure-from-Motion (SfM) algorithm to the video frame sequence, generating an estimated 3D point cloud by applying a filtering algorithm to the coarse estimated point cloud video frame sequence to filter out outliers, identifying a common coordinate system with respect to the model 3D point cloud and the estimated 3D point cloud, computing a rough alignment using a global registration algorithm and generating a fine registration pose estimation of the object by processing the rough alignment.

In addition to one or more of the features described above, or as an alternative to any of the foregoing embodiments, generating a CAD assembly model includes generating a CAD assembly model of predetermined area of the object.

In addition to one or more of the features described above, or as an alternative to any of the foregoing embodiments, generating a 2D borescope inspection video of the object includes generating the 2D borescope inspection video using a borescope.

In addition to one or more of the features described above, or as an alternative to any of the foregoing embodiments, generating a 2D borescope inspection video of the object includes generating the 2D borescope inspection video using a borescope.

In addition to one or more of the features described above, or as an alternative to any of the foregoing embodiments, generating a 2D borescope inspection video of the object includes generating the 2D borescope inspection video of a predetermined area of the object.

In addition to one or more of the features described above, or as an alternative to any of the foregoing embodiments, generating a coarse estimated point cloud video frame sequence includes processing the video frame sequence using COLMAP.

In addition to one or more of the features described above, or as an alternative to any of the foregoing embodiments, generating an estimated 3D point cloud includes processing the coarse estimated point cloud using a filtering algorithm to statistically filter out outlier data points.

In addition to one or more of the features described above, or as an alternative to any of the foregoing embodiments, identifying a common coordinate system includes comparing the model 3D point cloud and the estimated 3D point cloud.

In addition to one or more of the features described above, or as an alternative to any of the foregoing embodiments, computing a rough alignment includes processing the model 3D point cloud and the estimated 3D point cloud using a global registration algorithm to identify common areas of curvature.

In addition to one or more of the features described above, or as an alternative to any of the foregoing embodiments, generating a fine registration pose estimation of the object includes processing the rough alignment using an Iterative Close Points (ICP) algorithm.

Also disclosed is a method for generating a pose estimation for an object from a 2D borescope inspection video including generating a model 3D point cloud of a predetermined area of an object using a Computer Aided Design (CAD) assembly model of the object. The method includes extracting a video frame sequence from a 2D borescope inspection video of the object, generating an estimated 3D point cloud by processing the video frame sequence using a Structure-from-Motion (SfM) algorithm, identifying a common coordinate system with respect to the model 3D point cloud and the estimated 3D point cloud and computing a rough alignment by processing the common coordinate system, the model 3D point cloud and the estimated 3D point cloud using a global registration algorithm and generating a fine registration pose estimation by processing the rough alignment of the object.

In addition to one or more of the features described above, or as an alternative to any of the foregoing embodiments, the method further includes generating a CAD assembly model of the object.

In addition to one or more of the features described above, or as an alternative to any of the foregoing embodiments, extracting a video frame sequence includes generating the 2D borescope inspection video of the object using a borescope.

In addition to one or more of the features described above, or as an alternative to any of the foregoing embodiments, extracting a video frame sequence includes generating a 2D borescope inspection video of a predetermined area of the object.

In addition to one or more of the features described above, or as an alternative to any of the foregoing embodiments, generating an estimated 3D point cloud includes generating a coarse estimated point cloud by processing the video frame sequence using COLMAP.

In addition to one or more of the features described above, or as an alternative to any of the foregoing embodiments, generating an estimated 3D point cloud includes processing the coarse estimated point cloud to statistically filter out outlier data points.

In addition to one or more of the features described above, or as an alternative to any of the foregoing embodiments, identifying a common coordinate system includes comparing the model 3D point cloud and the estimated 3D point cloud.

In addition to one or more of the features described above, or as an alternative to any of the foregoing embodiments, computing a rough alignment includes processing the model 3D point cloud and the estimated 3D point cloud using a global registration algorithm to identify common areas of curvature.

In addition to one or more of the features described above, or as an alternative to any of the foregoing embodiments, generating a fine registration pose estimation of the object includes processing the rough alignment using an Iterative Close Points (ICP) algorithm.

Also disclosed is a computer-implemented method for generating a pose estimation for an object from a 2D borescope inspection video including generating a Computer Aided Design (CAD) assembly model of an object, generating a model 3D point cloud of the object using the CAD assembly model, generating a 2D borescope inspection video of the object, wherein the 2D borescope inspection video includes a plurality of video frames and extracting a video frame sequence from the plurality of video frames. The method includes generating a coarse estimated point cloud video frame sequence by applying a Structure-from-Motion (SfM) algorithm to the video frame sequence, generating an estimated 3D point cloud by applying a filtering algorithm to the coarse estimated point cloud video frame sequence to filter out outliers, identifying a common coordinate system with respect to the model 3D point cloud and the estimated 3D point cloud, computing a rough alignment using a global registration algorithm and generating a fine registration pose estimation of the object by processing the rough alignment.

In addition to one or more of the features described above, or as an alternative to any of the foregoing embodiments, extracting a video frame sequence includes generating the 2D borescope inspection video of the object using a borescope.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of illustration and not limitation with reference to the Figures.

Existing pose estimation frameworks need large amounts of labeled training data (e.g. key points on images for supervised training via deep learning). As such, unsupervised pose estimation is desired, but current methods are limited to certain extents (e.g. fitting silhouette of CAD/assembly model over the segmented images). Moreover, current methods are not always feasible due to clutter, environmental variations, illumination, transient objects, noise, etc., and a very small field-of-view (the entire part is typically not visible for any global pose estimation). Additionally, sparse/repetitive features may cause additional challenges for local pose estimation. These issues are exacerbated for smart factory application and other specialized applications because part geometries are typically specialized and nonstandard. This makes training off-the-shelf pose estimation and image registration framework difficult due to non-transferrable weight (i.e., domain shift) and lack of labeled training datasets.

In an embodiment, the method of the invention addresses the above problem via automated pose estimation using Structure-from-Motion (SfM) from borescope inspection videos for pose estimation in a borescope application. SfM is a photogrammetric range imaging technique that is used for estimating 3D structures from 2D image sequences that may be coupled with local motion signals. When applied with borescope inspection, SfM can be effective in recovering the geometry of objects. For example, consider a "turned inspection" situation where the borescope position is fixed, and the blades of a turbine are manually turned by the inspector (i.e., fixed camera, moving blade). In this situation, SfM may be employed to recover the geometry of the blade assembly. Additionally, consider a "wrapped inspection" situation where the borescope is wrapped and travels around the engine to inspect non-rotating parts, such as vanes (i.e., moving camera, fixed parts). In this situation, SfM may be employed to recover the geometry of the scene.

In accordance with an embodiment, the method of the invention uses SfM specifically for borescope inspection. The method uses the nature of the obtained data set being a video to perform an SfM pose estimation which allows for a 3D structure to be derived from real visual images by matching a 3D (image) to a 3D (point cloud) to minimize domain shift effects that would be an issue when aligning a 2D projection (image) to a 3D (point cloud). The method of the present invention does not require any additional modalities (e.g., depth sensor, point cloud measurements, etc.) as is typically required with current techniques of pose estimation from borescope inspection videos.

Figure 1:
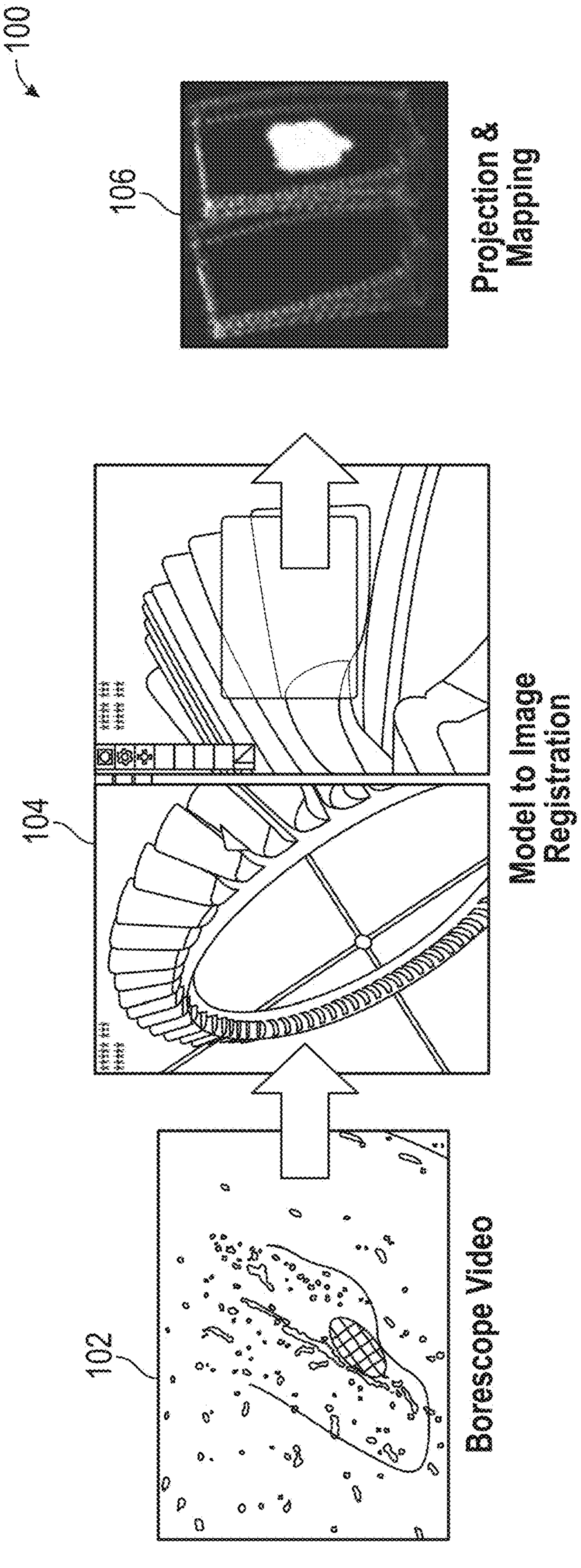
FIG. 1 (Prior Art)
FIG. 1 is a visual representing illustrating the current method for mapping a defect of an object onto a CAD model using a 2D borescope inspection video, in accordance with the prior art.
Figure 2:
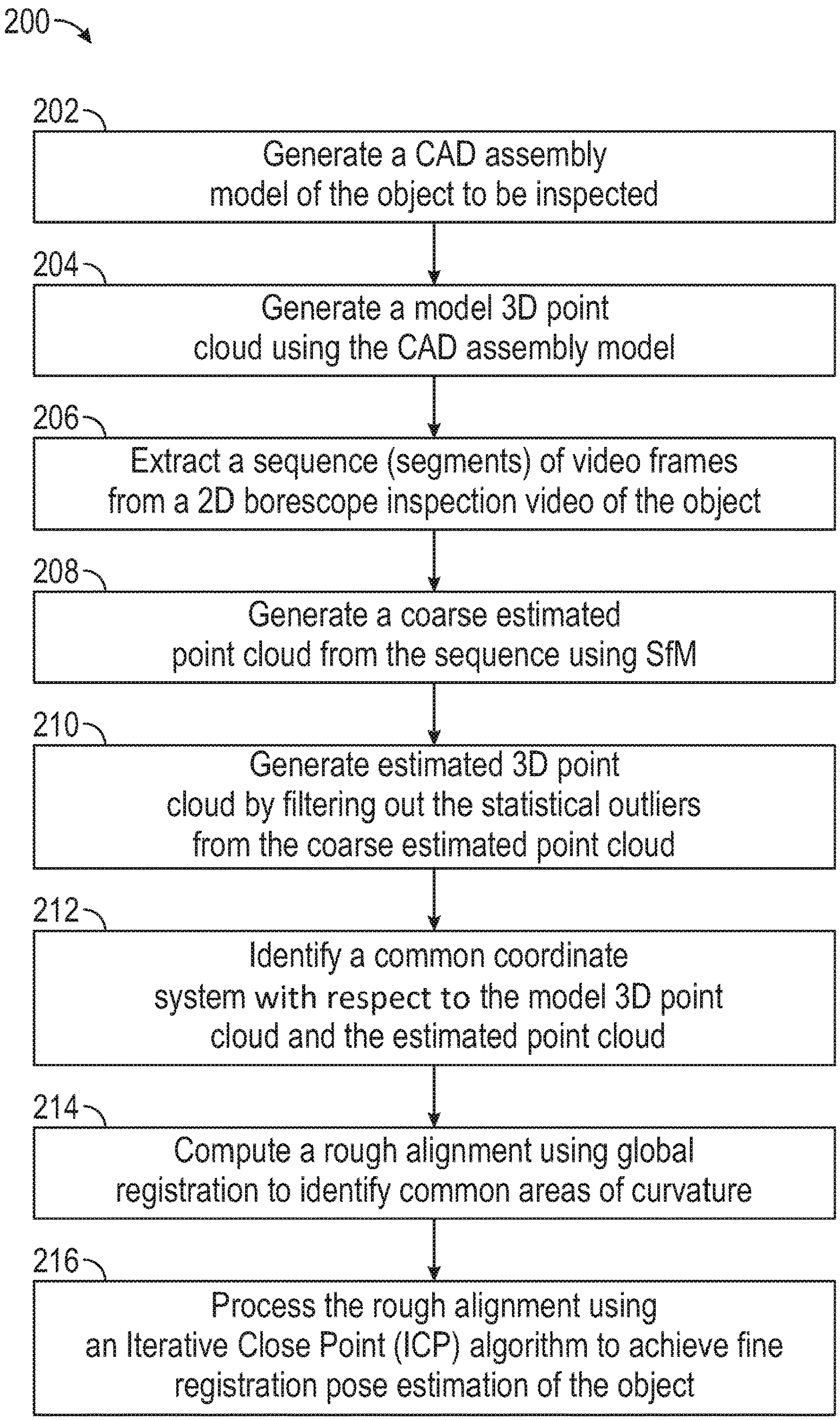
FIG. 2 is an operational block diagram illustrating a method for generating a 3D pose estimation from a 2D borescope inspection video, in accordance with an embodiment of the invention.
Figure 3:
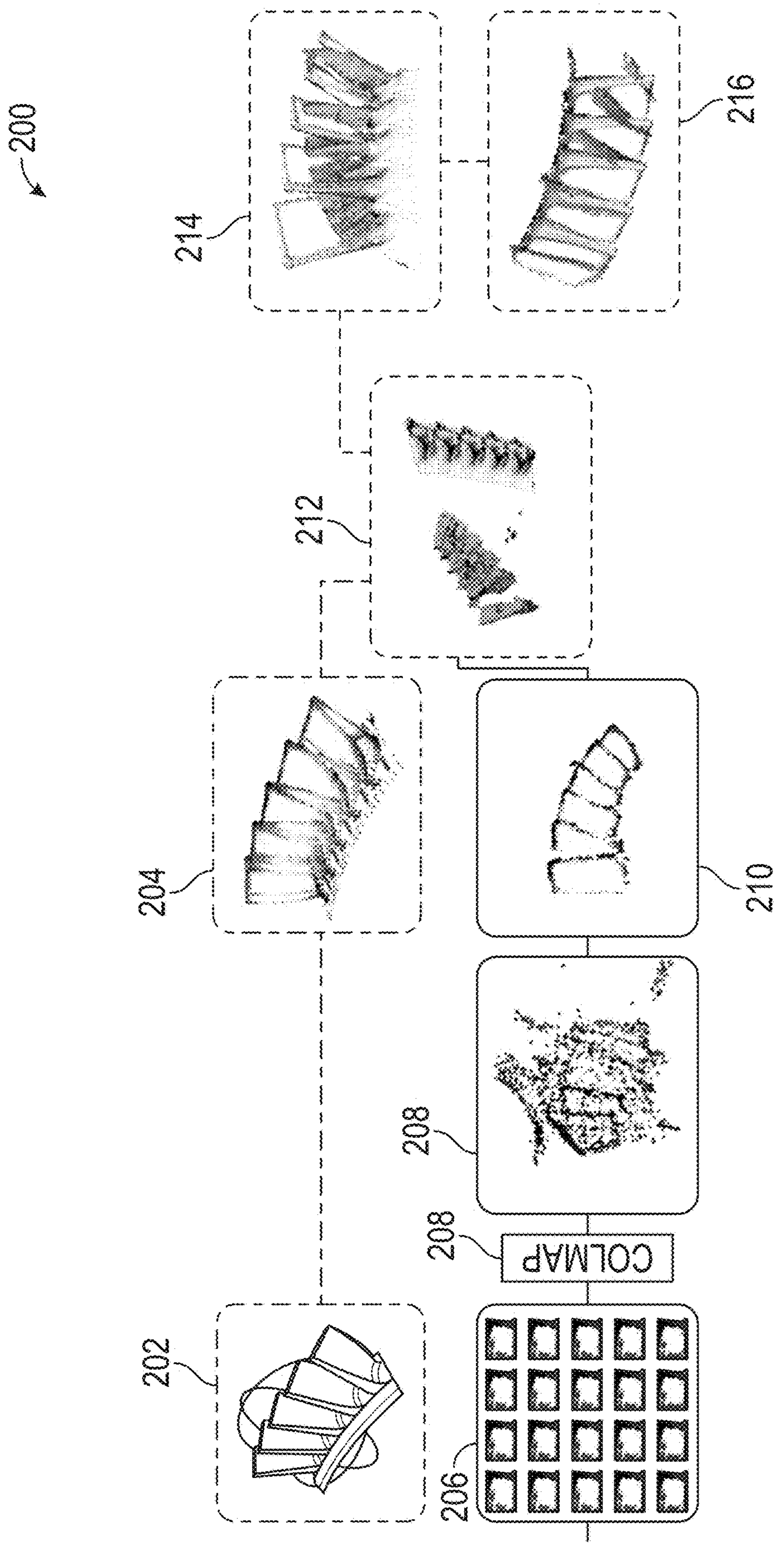
FIG. 3 is graphical depiction of the method of FIG. 1 being performed in accordance with an embodiment of the invention.
Figure 4:
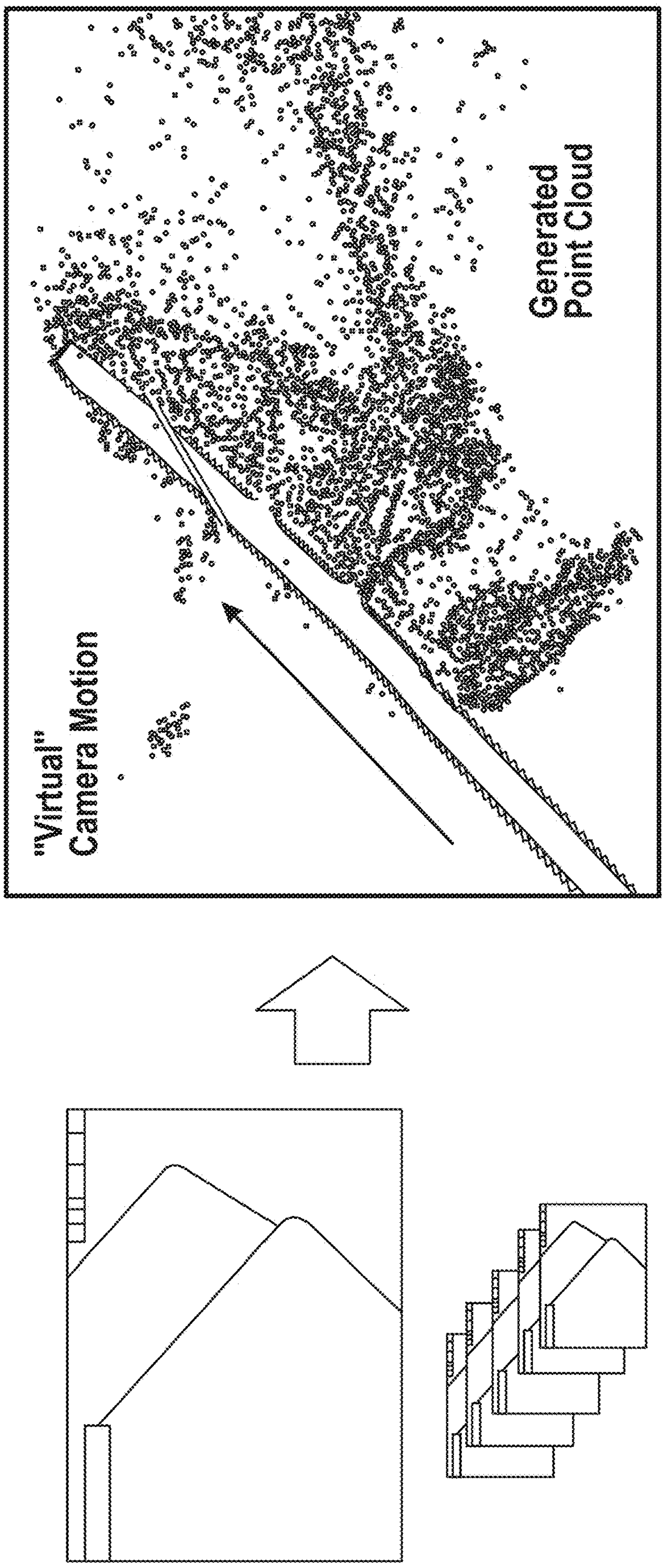
FIG. 4 illustrates a graphical representation of a resultant fine registration pose estimation of an object using the method of FIG. 1, in accordance with an embodiment of the invention.
Figure 5:
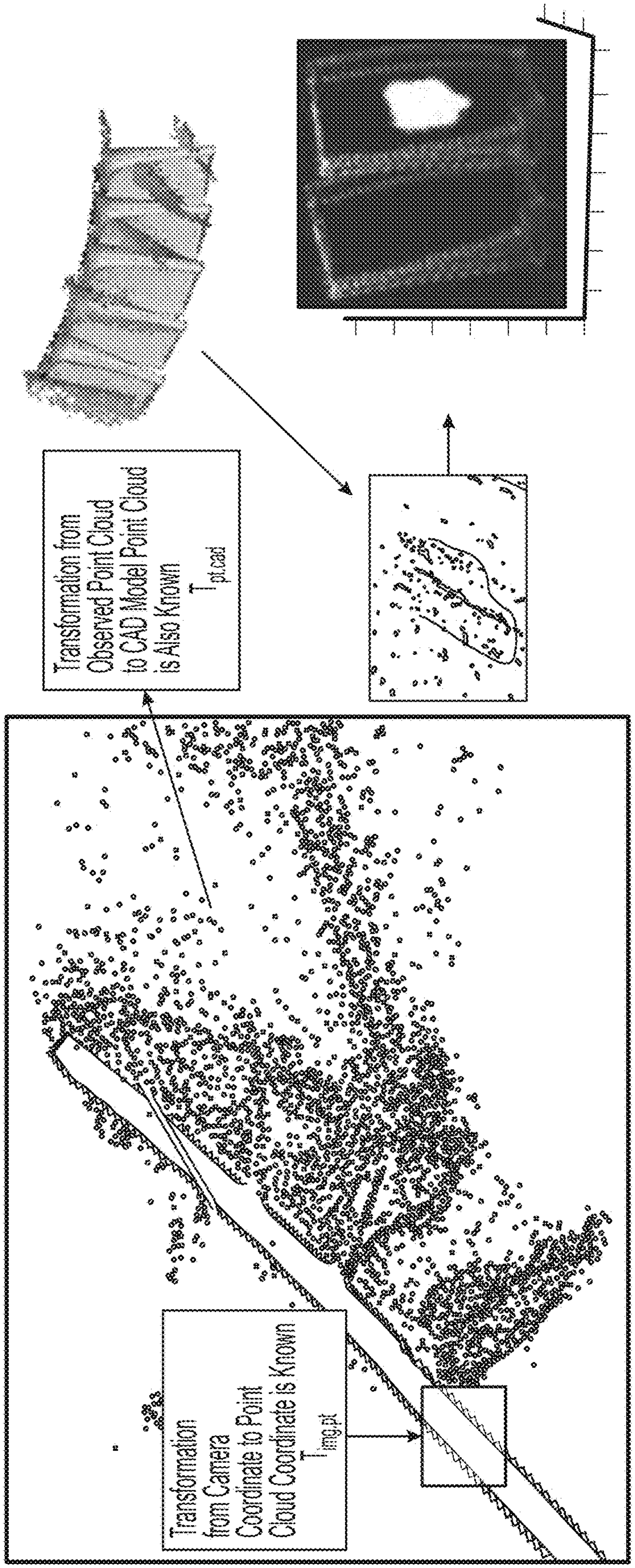
FIG. 5 illustrates fine registration pose estimation of the object generated using the method of FIG. 2, in accordance with an embodiment of the invention.

Referring now to FIG. 2 and FIG. 3, a method 200 for generating a pose estimation from a 2D borescope inspection video is provided, in accordance with an embodiment of the invention and includes generating a CAD assembly model of an object being inspected, as shown in operational block 202. The CAD assembly model is then processed to generate a model 3D point cloud, as shown in operational block 204. An inspection video of the object being inspected using a borescope is obtained and a sequence (i.e., segments) of the video frames from the inspection video is extracted, as shown in operational block 206. A coarse estimated point cloud is generated by processing the video frame sequence via SfM (e.g., using COLMAP), as shown in operational block 208. Referring to FIG. 4, one embodiment, of a coarse estimated point cloud generated via SfM (e.g., COLMAP) is illustrated. A estimated 3D point cloud is generated by statistically filtering the coarse estimated point cloud to remove statistical outliers, as shown in operational block 210. The model 3D point cloud and the estimated 3D point cloud are compared to identify a common coordinate system, as shown in operational block 212, and mathematically calculate a rough alignment between the model 3D point cloud and the estimated 3D point cloud, as shown in operational block 214. The rough alignment is then processed using an Iterative Close Points (ICP) algorithm to generate a fine registration pose estimation of the object, as shown in operational block 216. This fine registration pose estimation of the object is shown in FIG. 5.

It should be appreciated that there are numerous factors that can be considered to improve the quality of pose registration. For example, in an embodiment, in the point cloud estimation step computed from Structure-from-Motion (SfM) techniques, the number of input frames in the video sequence (i.e., size of the temporal window) is an important factor to consider. If the temporal window size is large, then there will be more blade motion, and thus more visual features are available for the SfM to return more points in the point cloud representation of the single blade part. This allows for better 3D part registration, since the resultant point cloud is richer with 3D information. If the temporal window size extends beyond the motion of multiple blades, then the resultant point cloud representation resembles the assembly, as opposed to a single part, which can be used to register a 3D CAD Model assembly to the 3D assembly point cloud instead. In other words, assembly-to-assembly registration could result in better pose estimation performance compared to part-to-part registration.

However, using large temporal window sizes is not always necessarily practical, since the time needed to perform SfM will increase significantly, which may be limited by business-driven constraints at deployment time. Furthermore, as more frames are analyzed over the blades, errors from feature-matching during the SfM step may start compounding. Thus, in an embodiment, the choice of temporal window size should consider the expected number of blades being inspected during the temporal window. For example, if it is expected to image 3 blades from the borescope window within a temporal window, then a CAD model assembly with the same number of blades, i.e., 3 blades, should be used for registration. It is important to select a corresponding window size, while balancing between computational requirements, and the overall registration performance.

In an embodiment, another potential method to improve registration performance is by reducing camera distortion effects. Borescope cameras are typically small, but to be able to increase the field of view, they tend to suffer from camera distortions such as the "fish-eye" effect. Applying SfM to derive point cloud from uncorrected videos may result in poorly estimated point clouds, which complicates registration of the undistorted 3D CAD Model to the distorted estimated point cloud. One way to address this issue involves first performing a camera calibration and transforming the image to remove distortions prior to using them as the input to SfM.

When converting the 3D CAD model to point cloud representations, several factors may impact the final registration quality. For example, point clouds can be sampled uniformly, randomly, and/or using other kinds of heuristics to convert the 3D CAD model data into a 3D point cloud representation. Density of point clouds is one of the factors to be considered that balances between computation time and accuracy. On the other hand, when processing the estimated 3D point clouds derived from the borescope video, there are numerous filtering methods that can be applied to remove noise and outliers. Among them, Statistical Outlier Removal (SOR) removes points that are further away from their neighbors compared to the average point cloud, while Radius Outlier Removal (ROR) removes points that have few neighbors in a given sphere around them. The best choice varies among different dataset and application domain.

In an embodiment, the quality of alignment between the 3D point cloud generated from CAD model and the 3D point cloud estimated from the borescope video can be dependent on its initialization in a common coordinate space. For example, if the two sets of point cloud are already initialized in roughly the same orientation, scale, and location in the common coordinate system, the final registration quality will be better than a randomly initialized counterpart. Hence, the point clouds can be initialized by leveraging prior known information. For example, given a canonical view or the typical inspection pose from a borescope video, initial estimation of the point cloud should provide an expectation in scale, orientation, and location of the output point clouds in the 3D space, which becomes the a priori information. Using these a priori information, the point cloud derived from the 3D CAD model can be pre-transformed to first make it coarsely similar to the point cloud estimated from the borescope video as a form of initialization. A good initialization will eventually make it easier for global registration and fine registration and will improve the overall registration quality.

Figure 6A:
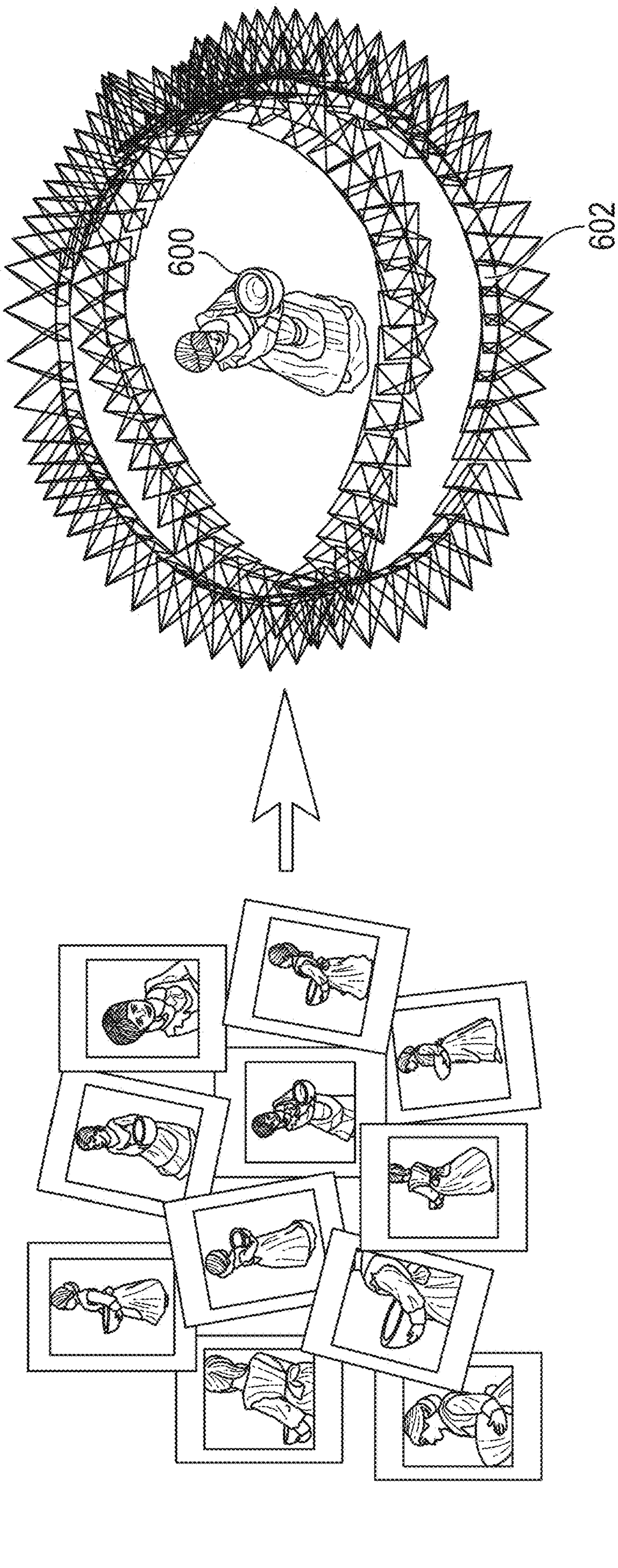
FIG. 6A illustrates a camera coordinate image representing the path of a camera as the camera is taking images of an object, in accordance with an embodiment.
Figure 6B:
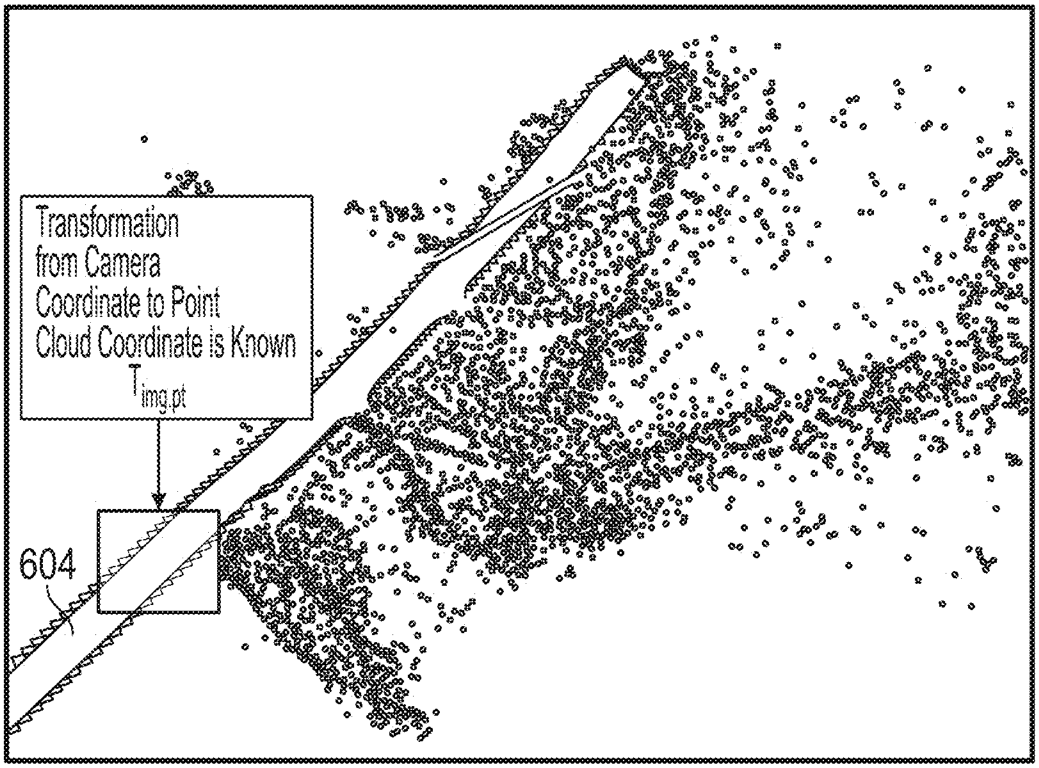
FIG. 6B illustrates a point cloud coordinate image representing the path of the camera in FIG. 6A, in accordance with an embodiment.

In an embodiment and referring to FIG. 6A and FIG. 6B, the path of a borescope camera (not shown) as the camera is circling and taking pictures of an object 600 (i.e., a statute) is shown as being represented as both a camera coordinate image and a point cloud coordinate image, respectively. Referring to FIG. 6A, the camera coordinate image shows the path of the camera as being represented as a ribbon trail 602 which is circling the object 600 while images of the object 600 are taken. Referring to FIG. 6B, the point cloud coordinate image shows the path of the camera while images of the object 600 are being taken as an elongated trail 604, where the data used to generate the elongated trail 604 represent the viewing positions of the camera and which are used to help recover the 3D point clouds.

It should be appreciated that the method 200 of the invention allows for assembly matching of an object knowing data about a frontal view only. In some embodiments, distortion in an image frame may be corrected using intrinsic camera techniques and/or distortion correction algorithms to achieve an improved fine registration pose estimation. In one or more embodiments, the method of the invention allows for a 3D structure to derived purely from data, thereby reducing the demand for hand-labeled annotations as compared to standard pose-estimation frameworks. Additionally, in some embodiments, training data collection may be automated via SfM methods (e.g., COLMAP) using an actual setup (e.g., camera mounted on robotic arms or mobile robots in the scene or factory floor).

It should be appreciated that, although the invention is described hereinabove with regards to the inspection of only one type of object, it is contemplated that in other embodiments the invention may be used for various types of object inspection. The invention may be used for application specific tasks involving complex parts, scenes, etc. especially in smart factories.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

In accordance with one or more embodiments, the processing of at least a portion of the method in FIG. 2 and FIG. 3 may be implemented by a controller/processor disposed internal and/or external to a computing device. In addition, processing of at least a portion of the method in FIG. 2 and FIG. 3 may be implemented through a controller/processor operating in response to a computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Additionally, the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire When implemented on a general-purpose microprocessor the computer program code segments may configure the microprocessor to create specific logic circuits.

Additionally, the processor may be part of a computing system that is configured to or adaptable to implement machine learning models which may include artificial neural networks, such as deep neural networks, convolutional neural networks, recurrent neural networks, vision transformers, encoders, decoders, or any other type of machine learning model. The machine learning models can be trained in a supervised, unsupervised, or hybrid manner.

While the present disclosure has been described with reference to an exemplary embodiment or embodiments, it will be understood by those skilled in the art that various changes may be made and equivalents may be substituted for elements thereof without departing from the scope of the present disclosure. Moreover, the embodiments or parts of the embodiments may be combined in whole or in part without departing from the scope of the invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this disclosure, but that the present disclosure will include all embodiments falling within the scope of the claims.

What is claimed is:

1. A method for generating a pose estimation for an object from a 2D borescope inspection video, the method comprising:

generating a Computer Aided Design (CAD) assembly model of an object;

generating a model 3D point cloud of the object using the CAD assembly model;

generating a 2D borescope inspection video of the object, wherein the 2D borescope inspection video includes a plurality of video frames;

extracting a video frame sequence from the plurality of video frames;

generating a coarse estimated point cloud video frame sequence by applying a Structure-from-Motion (SfM) algorithm to the video frame sequence;

generating an estimated 3D point cloud by applying a filtering algorithm to the coarse estimated point cloud video frame sequence to filter out outliers;

identifying a common coordinate system with respect to the model 3D point cloud and the estimated 3D point cloud;

computing a rough alignment using a global registration algorithm; and after generating the model 3D point cloud from the CAD assembly model and the estimated 3D point cloud from the coarse estimated point cloud video frame sequence, generating a fine registration pose estimation of the object by processing the rough alignment.

2. The method of claim 1, wherein generating a CAD assembly model includes generating a CAD assembly model of predetermined area of the object.

3. The method of claim 1, wherein generating a 2D borescope inspection video of the object includes generating the 2D borescope inspection video using a borescope.

4. The method of claim 1, wherein generating a 2D borescope inspection video of the object includes generating the 2D borescope inspection video of a predetermined area of the object.

5. The method of claim 1, wherein generating a coarse estimated point cloud video frame sequence includes processing the video frame sequence using COLMAP.

6. The method of claim 1, wherein generating an estimated 3D point cloud includes processing the coarse estimated point cloud using a filtering algorithm to statistically filter out outlier data points.

7. The method of claim 1, wherein identifying a common coordinate system includes comparing the model 3D point cloud and the estimated 3D point cloud.

8. The method of claim 1, wherein computing a rough alignment includes processing the model 3D point cloud and the estimated 3D point cloud using a global registration algorithm to identify common areas of curvature.

9. The method of claim 1, wherein generating a fine registration pose estimation of the object includes processing the rough alignment using an Iterative Close Points (ICP) algorithm.

10. A method for generating a pose estimation for an object from a 2D borescope inspection video, the method comprising:

generating a model 3D point cloud of a predetermined area of an object using a Computer Aided Design (CAD) assembly model of the object;

extracting a video frame sequence from a 2D borescope inspection video of the object;

generating an estimated 3D point cloud by processing the video frame sequence using a Structure-from-Motion (SfM) algorithm;

identifying a common coordinate system with respect to the model 3D point cloud and the estimated 3D point cloud; and computing a rough alignment by processing the common coordinate system, the model 3D point cloud and the estimated 3D point cloud using a global registration algorithm; and after generating the model 3D point cloud from the CAD assembly model and the estimated 3D point cloud from the video frame sequence, generating a fine registration pose estimation by processing the rough alignment of the object.

11. The method of claim 10, further comprising generating a CAD assembly model of the object.

12. The method of claim 10, wherein extracting a video frame sequence includes generating the 2D borescope inspection video of the object using a borescope.

13. The method of claim 10, wherein extracting a video frame sequence includes generating a 2D borescope inspection video of a predetermined area of the object.

14. The method of claim 10, wherein generating an estimated 3D point cloud includes generating a coarse estimated point cloud by processing the video frame sequence using COLMAP.

15. The method of claim 14, wherein generating an estimated 3D point cloud includes processing the coarse estimated point cloud to statistically filter out outlier data points.

16. The method of claim 10, wherein identifying a common coordinate system includes comparing the model 3D point cloud and the estimated 3D point cloud.

17. The method of claim 10, wherein computing a rough alignment includes processing the model 3D point cloud and the estimated 3D point cloud using a global registration algorithm to identify common areas of curvature.

18. The method of claim 10, wherein generating a fine registration pose estimation of the object includes processing the rough alignment using an Iterative Close Points (ICP) algorithm.

19. A computer-implemented method for generating a pose estimation for an object from a 2D borescope inspection video, comprising:

generating a Computer Aided Design (CAD) assembly model of an object;

generating a model 3D point cloud of the object using the CAD assembly model;

generating a 2D borescope inspection video of the object, wherein the 2D borescope inspection video includes a plurality of video frames;

extracting a video frame sequence from the plurality of video frames;

generating a coarse estimated point cloud video frame sequence by applying a Structure-from-Motion (SfM) algorithm to the video frame sequence;

generating an estimated 3D point cloud by applying a filtering algorithm to the coarse estimated point cloud video frame sequence to filter out outliers;

identifying a common coordinate system with respect to the model 3D point cloud and the estimated 3D point cloud;

computing a rough alignment using a global registration algorithm; and after generating the model 3D point cloud from the CAD assembly model and the estimated 3D point cloud from the coarse estimated point cloud video frame sequence, generating a fine registration pose estimation of the object by processing the rough alignment.

20. The computer implemented method of claim 19, wherein extracting a video frame sequence includes generating the 2D borescope inspection video of the object using a borescope.

* * * * *